(12) United States Patent
Lonski

(10) Patent No.: US 9,718,476 B2
(45) Date of Patent: Aug. 1, 2017

(54) DEVICE FOR TEACHING A DRIVER TO DRIVE IN A FUEL EFFICIENT MANNER

(71) Applicant: Jonathan David Lonski, East Brunswick, NJ (US)

(72) Inventor: Jonathan David Lonski, East Brunswick, NJ (US)

( * ) Notice: Subject to any disclaimer, the term of this patent is extended or adjusted under 35 U.S.C. 154(b) by 0 days.

(21) Appl. No.: 14/798,989

(22) Filed: Jul. 14, 2015

(65) Prior Publication Data
US 2017/0015332 A1   Jan. 19, 2017

(51) Int. Cl.
| | |
|---|---|
| *B60W 50/14* | (2012.01) |
| *G07C 5/08* | (2006.01) |
| *G01S 19/13* | (2010.01) |
| *B60W 30/14* | (2006.01) |
| *G01S 19/49* | (2010.01) |

(52) U.S. Cl.
CPC .......... *B60W 50/14* (2013.01); *B60W 30/146* (2013.01); *G01S 19/13* (2013.01); *G01S 19/49* (2013.01); *G07C 5/0808* (2013.01); *B60W 2050/143* (2013.01); *B60W 2050/146* (2013.01); *B60W 2520/16* (2013.01)

(58) Field of Classification Search
CPC .............. B60W 50/14; B60W 30/146; B60W 2050/143; B60W 2050/146; B60W 2520/16; G07C 5/0808; G01S 19/13
See application file for complete search history.

(56) References Cited

U.S. PATENT DOCUMENTS

| | | | |
|---|---|---|---|
| 7,365,769 B1* | 4/2008 | Mager | B60Q 1/44 340/467 |
| 2009/0079555 A1* | 3/2009 | Aguirre De Carcer | G07C 5/008 340/441 |
| 2009/0326753 A1* | 12/2009 | Chen | G01C 21/3469 701/31.4 |
| 2012/0191343 A1* | 7/2012 | Haleem | G01C 21/3697 701/431 |
| 2015/0134226 A1* | 5/2015 | Palmer | B60W 40/10 701/101 |

* cited by examiner

*Primary Examiner* — Genna Mott
(74) *Attorney, Agent, or Firm* — Haug Partners LLP

(57) ABSTRACT

A device is provided for teaching a driver of a vehicle in real-time to operate the vehicle in a fuel efficient manner based on feedback from a plurality on on-board sensors on the vehicle.

15 Claims, 2 Drawing Sheets

DEVICE FOR TEACHING A DRIVER TO DRIVE IN A FUEL EFFICIENT MANNER

BACKGROUND

1. Field of the Disclosure

The present disclosure is directed to a device used to teach an operator of a vehicle a more fuel efficient way to operate the vehicle based on feedback from a plurality of devices installed on the vehicle.

2. Related Art

There are several mobile application based programs that use the on-board diagnostic system (OB-II port) on the vehicle to provide information to the driver.

U.S. Pat. No. 8,868,289 by Miljkovic, et al. and assigned to Automatic Labs, Inc. discloses a connector to the on-board diagnostic port of the vehicle in order to monitor the ignition state of the vehicle and to wirelessly transmit the ignition state, time, date and location information to a driver such as a driver's cell phone.

A few of the other mobile applications that are available are devices by Automatic, Mojio, and Zubie.

Automatic describes its device as a wireless adaptor that plugs into the car's diagnostic port and connects to the car owner's cell phone whenever the vehicle is driven. When enabled, the device will give audio warnings for speed. The device knows the vehicles location. Also, the device will export mileage data and issue a low fuel warning.

Mojio describes its device as a cellular GPS device that can connect with family and friends, when the vehicle is driven, through personalized prompts, messages and geographical features. The device is described as a virtual driving assistant that analyzes and interprets data from the vehicle. The device provides a driving score which can be compared to other drivers that have the Mojio device. The device can send the vehicle's location to selected contacts. The device sends notifications to the cell phone of the vehicle's owner. The Mojio system is an open platform that allows developers to create new applications for the device.

Zubie describes its Zubie™ key as a device that connects to a vehicle to deliver safety features, vehicle diagnostics and driving insights to the vehicle owner's smartphone. The device monitors battery voltage. It can also alert the vehicle owner to engine problems. In addition, location information can be shared. The Zubie™ key plugs into the dashboard of the vehicle and connects wirelessly to the cloud. The device uses a built-in GPS.

The prior art devices all give driving tips and information after the trip is completed. None of the devices give real-time coaching to the driver while the driver is operating the vehicle.

SUMMARY

The present disclosure is directed to teaching an operator of a vehicle in real-time improved fuel efficient driving habits to follow while driving based on feedback from the on-board diagnostic system of the vehicle, an angle of inclination of the vehicle and an adaptive governor system on the vehicle.

One advantage of the present disclosure is that an operator of the vehicle is taught in real-time improved fuel efficient driving habits to follow. An instruction device instructs the driver of a vehicle. The instruction device includes a display screen displaying visual instructions, a speaker outputting audio instructions, sensors detecting an inclination angle of the vehicle and a controller. The controller obtains vehicle diagnostics from an on-board diagnostic system of the vehicle, obtains GPS information from a geo-mapping service and obtains the inclination angle from the sensors. The controller determines instructions for fuel-efficient driving. The controller outputs the instructions via the display screen and speaker in real time while the driver is driving the vehicle.

An additional feature of the disclosure is that the controller calculates a score indicating how well the driver complies with the output instructions.

A further feature of the disclosure is that the controller obtains speed limits of roads the vehicle is travelling on. The controller outputs a maximum vehicle speed to an adaptive speed governor system of the vehicle.

Another feature of the disclosure is that the controller obtains speed limits of the road the vehicle is traveling on and outputs instructions in real-time via the display screen and speaker to the driver based on the obtained speed limits.

An additional feature of the disclosure is that the controller obtains maintenance information from the on-board diagnostic system, determines that the vehicle maintenance is affecting fuel efficiency and outputs the determination thereof to the driver.

A further feature of the disclosure is that the controller outputs the score indicating how well the driver complies with the output instructions to a web server.

Another feature of the disclosure is that the controller outputs the score indicating how well the driver complies with the output instructions to a cell phone of the driver.

An additional feature of the disclosure is that connectors connect the controller to the on-board diagnostic system.

A further feature of the disclosure is that the device further includes at least one light sensor to determine an amount of light entering an interior of the vehicle. The controller then updates the score based on the amount of light.

Another feature of the disclosure is providing a method of providing driving instructions to a driver of a vehicle. The method includes obtaining vehicle diagnostics from an on-board diagnostic system of the vehicle, obtaining GPS information from a geo-mapping service, obtaining an inclination angle of the vehicle and obtaining and outputting instructions for fuel efficient driving for a driver of the vehicle in real-time while the driver is driving the vehicle.

An additional feature of the disclosure includes outputting visual instructions for the driver of the vehicle.

Another feature of the disclosure includes outputting audio instructions for the driver of the vehicle.

A further feature of the disclosure is to calculate a score indicating how well the driver complied with the instructions.

Another feature of the disclosure is to obtain speed limits of the road the vehicle is traveling on and to output a maximum vehicle speed to an adaptive speed governor system of the vehicle.

An additional feature of the disclosure is to obtain speed limits of the road the vehicle is traveling on and to output visual instructions and audio instructions to the driver in real-time based on the obtained speed limits.

A further feature of the disclosure is to obtain maintenance information from the on-board diagnostic system and to determine if vehicle maintenance is affecting fuel efficiency.

An additional feature of the disclosure is to output the score to a web server.

A further feature of the disclosure is to output the score to a cell phone of the driver.

Another feature of the disclosure is to obtain an amount of light entering an interior of the vehicle from light sensors and updating the score based on the amount of light.

The foregoing and other features and advantages of the present disclosure will be more readily understood upon consideration of the following detailed description of the disclosure taken in conjunction with the accompanying drawings.

BRIEF DESCRIPTION OF THE DRAWINGS

The present disclosure can be easily understood with reference to the following drawings which are for illustrative purposes only.

DETAILED DESCRIPTION

The present disclosure will now be described with reference to the accompanying drawings in which a preferred embodiment is shown. The disclosure, however, may be embodied in many different forms and therefore should not be construed as limited to the embodiment as set forth herein.

The present disclosure is directed to a device to teach a driver of a vehicle improved fuel efficient driving techniques while driving the vehicle. The device uses feedback from the vehicles on-board diagnostic system (OB-11 port), an angle of inclination of the vehicle based on sensors inside the device itself, and an adaptive governor provided on the vehicle. The adaptive governor system takes information from a geo-mapping service, such as a GPS system, in order to set a maximum speed the vehicle can achieve based on the road traveled. The device will also calculate a score for the driver based on how well the driver complies with instructions from the device. A high score indicates good driving habits and fuel efficient driving. The driving score can be uploaded to a web server for evaluation by the driver, management personnel, a driving instructor or parent.

Figure 1:
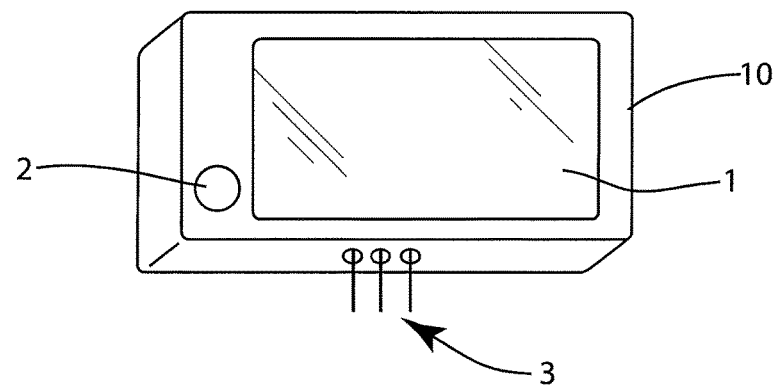
FIG. 1 discloses the device.

FIG. 1 shows the device 10 itself before attachment to the dashboard of a vehicle. The device shown in FIG. 1 is for illustrative purposes only and should not limit the physical design itself. For example, the device may be circular or square rather than rectangular as illustrated. The device includes a display screen 1 and an audio system 2 which provides voice commands. The exact layout of the screen and audio system should not be limited to the illustration. The device also includes a place to attach connectors 3. The exact location of the connectors shown in the figure is also not limiting. The connectors 3 attach to the on-board diagnostic system of the vehicle, to the adaptive governor system and to the geo-mapping service.

Figure 3:
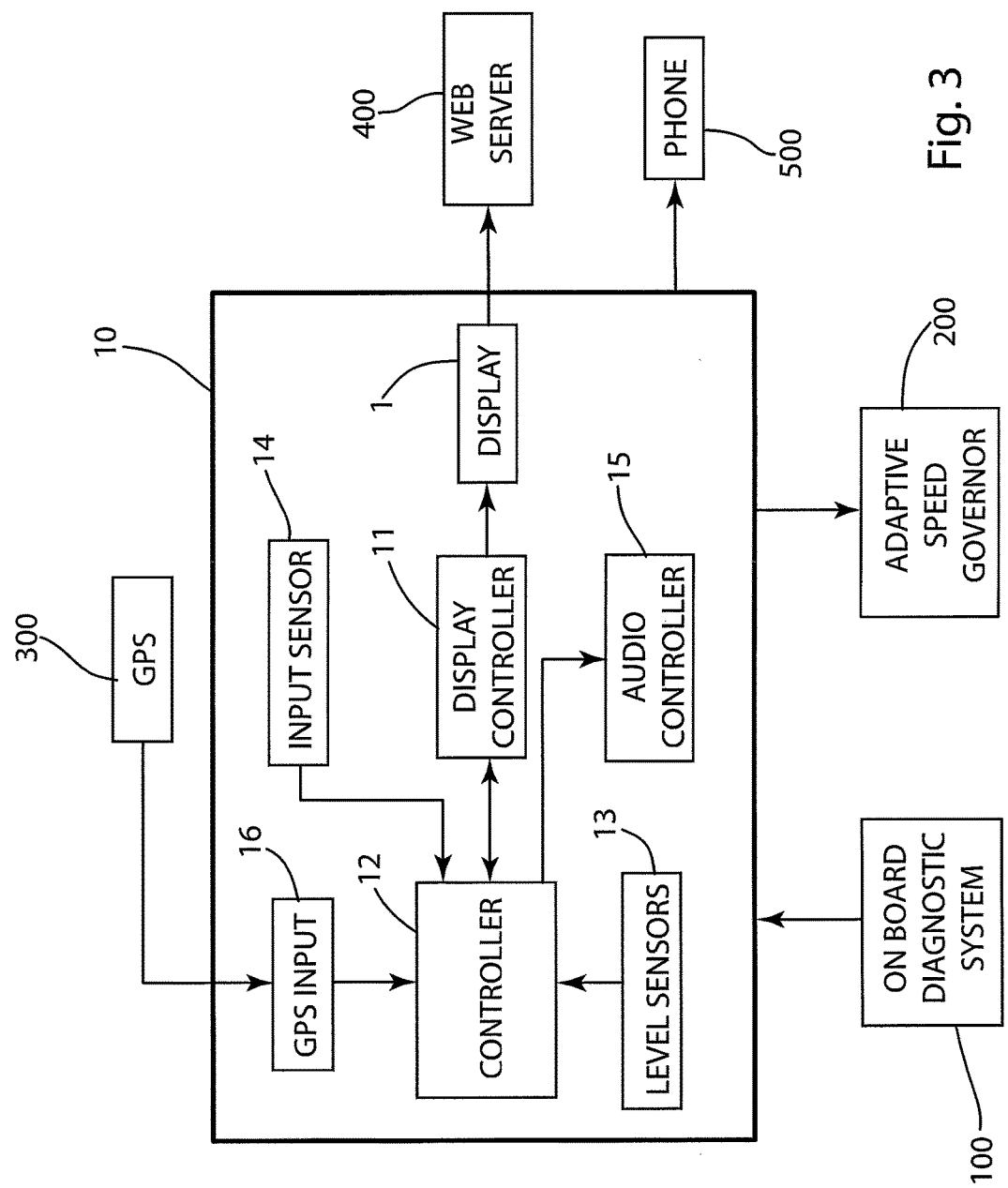
FIG. 3 illustrates the internal systems of the device.

The device 10 has an input unit for the driver to enter information, such as weight of the vehicle. The input unit can be, for instance, a touch screen on the display screen 1. Other input devices and methods can also be used. Inside the device, as shown in FIG. 3, is at least a display controller 11 to control the display screen 1 and a controller or control unit 12 which obtains data from the on-board diagnostic system 100. The control unit 12 also obtains information from a geo-mapping service 300 The geo-mapping service can be a wireless service. The device 10 will receive signals from any GPS satellite and will retrieve data from a database to determine the speed limits at the location on the road where the vehicle is traveling.

In addition, the device 10 contains sensors 13 to measure the angle of inclination of the vehicle. The sensors 13 could be similar to a pendulum. As the vehicle moves up and down due to hills, the pendulum will move. The device will measure how far the pendulum has moved and calculate an angle of inclination of the vehicle. Although a pendulum is described here, the sensors 13 are not limited thereto and can be any sensor which measures an angle of inclination including accelerometers, gyroscopes, and the like. The output from the sensors 13 is input to the control unit 12. The device 10 may also contain light sensors 14. The output from the light sensors 14 are input to the control unit 12 so that the amount of sunlight entering the vehicle can be determined.

Figure 2:
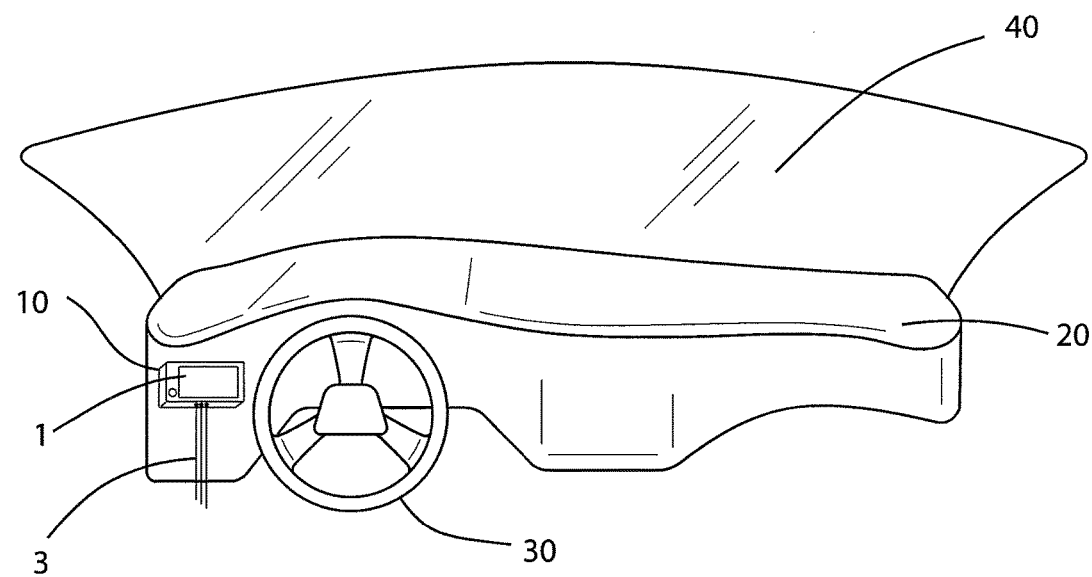
FIG. 2 illustrates the device connected to the dashboard of a vehicle.

FIG. 2 illustrates the device 10 mounted on a dashboard 20 of the vehicle adjacent to the steering wheel 30 and below the windshield 40 so the driver can see the display screen 1 of the device 10. Placement of device 10 in FIG. 2 is for illustration only and can be elsewhere in the vehicle. Connectors 3 connect the device 10 to the on-board diagnostic system 100, the adaptive speed governor 200 and to the geo-mapping service 300.

As the operator of the vehicle drives the vehicle, the control unit 12 of the device 10 will receive output signals from the on-board diagnostic system 100 for engine RPM, acceleration, idle time and time in cruise control. Additional output from the on-board diagnostic system 100 to the control unit 12 of the device 10 will be information about the maintenance of the vehicle. The information received by the control unit 12 will be used to determine if the maintenance is affecting the efficiency of the vehicle. In addition, the control unit 12 can determine if the vehicle needs to be serviced.

At the start of a trip, the display screen 1 will display information to the driver. In particular, the driver will be prompted to enter the weight of the load the vehicle is carrying or pulling. The driver can enter the information via the touch screen or via another type of input unit. In addition, the control unit 12 will obtain output from the level sensor or inclination sensor 13, located within the device 10 itself, indicating the inclination of the vehicle. Based on the RPM, acceleration, idle time, cruise control information, maintenance information, weight of load and angle of inclination, the control unit 12 will output information to the display controller 11 for the display screen 1 to display visual instructions on how to increase fuel efficiency through better driving habits. In addition, audio instructions will also be provided to the driver via audio controller 15 to the audio system 2. The instructions include when to slow down, accelerate, maintain speed, accelerate more slowly, accelerate more quickly, etc. Thus, the device 10 will provide real-time coaching to the driver while the driver is operating the vehicle. It should be noted that the driving tips provided to the driver are based upon outputs from the on-board diagnostic system 100 as well as the inclination sensor 13 which indicates the level of inclination of the vehicle as the vehicle is driving along. The device 10 also receives signals from the geo-mapping service 300 via the GPS input 16 about the speed limit of each road the vehicle is traveling on. The output from the geo-mapping service 300 to the device 10 will cause the control unit 12 to issue visual and audio alerts via the display screen 1 and audio system 2 to the driver such as when to slow down or accelerate ahead of time based on the route taken and the speed limit of the road.

Additionally, the vehicle may have an adaptive speed governor system 200. The adaptive speed governor system 200 are known in the art. The speed governor system 200 is a micro-controller based electronic unit which constantly monitors the speed of the vehicle and controls the vehicle speed within preset limits. Thus, the speed governor can restrict the maximum speed of a vehicle to a preset limit.

The device 10 of the present disclosure has the ability to control the computer system of the vehicle that regulates the governing speed of the vehicle by adjusting the maximum speed of the vehicle based on the speed limit of the road. The maximum speed of a vehicle is regulated by an on-board computer system. Rather than using a preset speed for the vehicle, the device 10 of the present disclosure would input the speed limit to the on-board computer system that the geo-mapping system provides for each road in order to set the maximum vehicle speed. Based on the maximum speed of the road from the geo-mapping service 300, the control unit 12 will output the maximum vehicle speed for the adaptive speed governing unit 200 in order to control the maximum speed the vehicle can go. This will aid the driver by preventing the vehicle from exceeding the speed limit for the road.

An additional feature of the device is that the device will receive information about the maintenance of the vehicle from the on-board diagnostic port 100. The control unit 12 of the device can then determine if maintenance of the vehicle is affecting the efficiency of the vehicle and whether the vehicle needs to be serviced. This is done by analyzing every possible alert the on-board diagnostic system outputs for maintenance issues and determining whether the alert effects fuel efficiency. For example, maintenance issues for vehicle lights do not affect fuel efficiency and can be ignored by the system according to an embodiment of the disclosure whereas tire pressure, and engine issues will affect fuel efficiency. In particular, the control unit 12 will classify if any maintenance issues are affecting fuel efficiency. In addition, the control unit 12 will determine how far the vehicle can still travel safely and/or efficiently before being serviced. This is based on the approximate number of miles the vehicle can still travel when the alert is issued before fuel efficiency is diminished at all, or before fuel efficiency is diminished below a certain threshold. This information can then be displayed to the driver or downloaded wired or wireless to a web server 400 or a smart phone 500.

Once the driver has finished traveling in the vehicle, the device will use a system of formulas to calculate a score indicating how well the driver complied with the device's visual and audio instructions. The formula represents a pattern when the driver speeds up or slows down going up and down hills for an optimal vehicle route and mode of operation. The formula will change based on the weight the vehicle is carrying. The device will calculate the deviation between the vehicle's actual route and mode of operation and the optimal vehicle route and mode of operation. The calculated score indicates how close to the optimal the vehicle was driven. Thus, the score will represent how fuel efficiently the driver was driving. The score will be sent to the web server 400 where the owner of the vehicle or manager of the vehicle can monitor and evaluate the driver's performance. The manager/owner will also be able to compare data prior to installation of the device 10 on the vehicle with data after installation of the device 10 on the vehicle in order to determine estimated cost savings from improved driving habits. This is especially important when the device 10 is installed on a commercial vehicle such as a truck.

A further feature of the device 10 is that light sensors 14 may be provided on the device 10 or the device 10 may be attached to light sensors found within the interior of the vehicle. The output from the light sensors are used by the control unit 12 to determine how much sunlight enters the vehicle. The driver's score will improve when the driver allows sunlight to enter the vehicle while the vehicle is idle in the winter months since the increase in heat from the sunlight in the interior of the vehicle will allow the interior of the vehicle to warm up without turning the heater on. Similarly, the driver's score will improve in summer months when the idle vehicle is kept shaded in order to keep the interior of the vehicle cool without turning the air condition on to cool the vehicle.

The present disclosure can be used in private vehicles as well as commercial vehicles. The present disclosure is directed to a device to coach a driver of the vehicle to have good driving habits. The present disclosure includes the level of inclination of the vehicle into consideration when creating driving tips for the driver.

While the disclosure has been described above, it will be appreciated that modifications and changes may be made by those skilled in the art without departing from the spirit and scope of the disclosure. Thus, the scope of the disclosure should be defined by the appended claims.

What is claimed is:

1. An instruction device for instructing a driver of a vehicle comprising:
   a display screen displaying visual instructions;
   a speaker outputting audio instructions;
   sensors detecting an inclination angle of the vehicle;
   at least one light sensor to monitor heating of an interior of the vehicle by detecting an amount of sunlight entering the interior of the vehicle; and
   a controller for obtaining:
      vehicle diagnostics from an on-board diagnostic system of the vehicle;
      GPS information from a geo-mapping service; and
      the inclination angle from the sensors;
   wherein the controller determines instructions for fuel efficient driving based at least in part on the vehicle diagnostics, the GPS information and the inclination angle, and outputs the instructions via the display screen and speaker in real-time while the driver is driving the vehicle;
   wherein the controller calculates a score indicating how fuel efficiently the driver is driving based at least in part on the instructions, the vehicle diagnostics, the GPS information, and the inclination angle; and
   wherein the controller updates the score based on the amount of sunlight.

2. The instruction device according to claim 1, wherein the controller obtains speed limits of roads the vehicle is traveling on and outputs a maximum vehicle speed to an adaptive speed governor system of the vehicle.

3. The instruction device according to claim 1, wherein the controller obtains speed limits of the road the vehicle is traveling on and outputs instructions in real-time via the display screen and speaker to the driver based on the obtained speed limits.

4. The instruction device according to claim 1, wherein the controller obtains maintenance information from the on-board diagnostic system, determines if vehicle maintenance is affecting fuel efficiency and outputs the determination thereof to the driver.

5. The instruction device according to claim 1, wherein the controller outputs the score to a web server.

6. The instruction device according to claim 1, wherein the controller outputs the score to a cell phone of the driver.

7. The instructions device according to claim 1, further comprising:
connectors connecting the controller to the on-board diagnostic system.

8. A method of providing driving instructions to a driver of a vehicle comprising the steps of:
obtaining vehicle diagnostics from an on-board diagnostic system of the vehicle;
obtaining GPS information from a geo-mapping service;
obtaining an inclination angle of the vehicle;
determining and outputting instructions for fuel efficient driving for the driver of the vehicle in real-time while the driver is driving the vehicle based at least in part on the vehicle diagnostics, the GPS information and the inclination angle;
calculating a score indicating how fuel efficiently the driver is driving based at least in part on the instructions, the vehicle diagnostics, the GPS information, and the inclination angle; and
monitoring heating of an interior of the vehicle by detecting an amount of sunlight entering the interior of the vehicle from light sensors and updating the score based on the amount of sunlight.

9. The method according to claim 8, further comprising the step of:
outputting visual instructions for the driver of the vehicle.

10. The method according to claim 8, further comprising the step of:
outputting audio instructions for the driver of the vehicle.

11. The method according to claim 8, further comprising the step of:
obtaining speed limits of the road the vehicle is traveling on and outputting a maximum vehicle speed to an adaptive speed governor system of the vehicle.

12. The method according to claim 8, further comprising the step of:
obtaining speed limits of the road the vehicle is traveling on and outputting visual instructions and audio instructions to the driver in teal-time based on the obtained speed limits.

13. The method according to claim 8, further comprising the step of:
obtaining maintenance information from the on-board diagnostic system and determining if vehicle maintenance is affecting fuel efficiency.

14. The method according to claim 8, further comprising the step of:
outputting the score to a web server.

15. The method according to claim 8, further comprising the step of:
outputting the score to a cell phone of the driver.

* * * * *